United States Patent [19]

Akiba

[11] Patent Number: 4,843,305

[45] Date of Patent: Jun. 27, 1989

[54] SPACER-SEPARATED LIQUID LEAKAGE SENSOR

[75] Inventor: Juji Akiba, Hitaka, Japan

[73] Assignee: W. L. Gore & Associates, Inc., Newark, Del.

[21] Appl. No.: 240,874

[22] Filed: Sep. 2, 1988

[30] Foreign Application Priority Data

Apr. 9, 1987 [JP] Japan .............................. 62-136052[U]

[51] Int. Cl.⁴ ....................... G01R 27/00; G01B 21/00
[52] U.S. Cl. ................................. 324/65 P; 174/11 R; 340/605; 340/604
[58] Field of Search .................... 324/65 R, 65 P, 557, 324/551, 554, 555, 556, 71.1; 340/603–605; 174/11 R, 115

[56] References Cited

U.S. PATENT DOCUMENTS

| | | | |
|---|---|---|---|
| 4,288,653 | 9/1981 | Blom et al. | 174/11 R X |
| 4,319,232 | 3/1982 | Westphal et al. | 340/605 X |
| 4,386,231 | 5/1983 | Vokey | 174/114 R X |
| 4,598,277 | 7/1986 | Feldman | 340/605 X |
| 4,677,371 | 6/1987 | Imaizumi | 174/11 R X |

FOREIGN PATENT DOCUMENTS 1540626  1/1970  Fed. Rep. of Germany .... 324/65 R

Primary Examiner—Reinhard J. Eisenzopf
Assistant Examiner—Jack B. Harvey
Attorney, Agent, or Firm—Gary A. Samuels

[57] ABSTRACT

A liquid leakage sensor having spaced apart pairs of insulated conductors on opposite sides of a strip of insulation and aperture access from one side of the strip to conductors on the other side. Can be wrapped about small pipes or objects without conductor breakthrough of insulation and electrical contact with pipe.

5 Claims, 1 Drawing Sheet

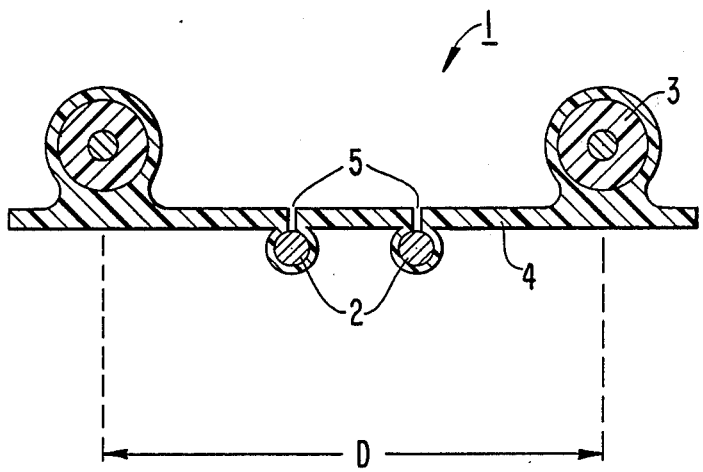

SPACER-SEPARATED LIQUID LEAKAGE SENSOR

FIELD OF THE INVENTION

The invention relates to a cable-form of liquid leakage sensor which can be appropriately wrapped around the welded areas of pipes or the like and in which electrical contact is prevented between the conductors and the welded areas of the pipe.

BACKGROUND OF THE INVENTION

Conventionally, cable forms of liquid leakage sensors have been subject to the problem that, in cases where a pipe, for example, around which the sensor has been wrapped is of small diameter, the radius of curvature of the wrapped sensor is also small so that the sensor is functionally effectively close to the source of possible leakage being monitored. As a result, the conductors of the sensor may protrude in the direction of wrapping toward the pipe so that they rupture the insulation and possibly extend from the insulation to contact the pipe.

In order to solve the above problem, it is an object of the present invention to provide a liquid leakage sensor in which there is no contact between the conductors of the sensor and the welded areas or any other areas of the pipe, and to cause no problems of faulty insulation, even when the sensor is wrapped around a small-diameter pipe.

SUMMARY OF THE INVENTION

The present invention is developed in order to solve the above problem. It provides a liquid leakage sensor equipped with spacers. The sensor consists of at least two conductors which are positioned so that they are separated from each other, with at least one spacer installed on either side of the conductors, and insulation which has openings that are regularly formed so that the conductors are exposed at prescribed intervals along their lengths, the sensor being designed so that the conductors and the spacers are integrally supported by the insulation.

In the present invention, the conductors and spacers are integrally supported by the insulation, such that when the sensor is wrapped around a pipe, for instance, the conductors are positioned between the spacers, so that a sufficient distance is maintained between the pipe and the conductors. Thus, contact between the conductors and pipe is prevented.

Further, by positioning the conductors on the opposite side of the sensor from the spacer, it is possible to achieve a sufficiently small spacing between the spacers, so that there is no danger of the conductors protruding through the insulator as a result of the conductors distending inwardly when the sensor is wrapped around the pipe.

At the same time, since the insulation has openings which are formed so that the conductors are exposed at prescribed intervals along their lengths, any conductive liquid leaking from the welded joints of the pipe or other liquid containing object will collect in these openings, thus short-circuiting the conductors so that the liquid leakage is detected by a detector connected to the sensor.

BRIEF DESCRIPTION OF THE FIGURE

FIG. 1 is a cross-sectional view of the spacer-equipped leakage sensor of the invention.

DETAILED DESCRIPTION OF THE PREFERRED EMBODIMENTS

With reference to the figure, conductors 2 consisting of nickel-plated soft copper wires, which are formed by twisting together seven 0.16 mm strands and spacers 3, consisting of tin-plated soft copper wires, which are formed by twisting together thirty 0.18 mm strands are coated with a 0.25 mm layer of PTFE (polytetrafluoroethylene) and integrally supported by PTFE insulation 4. Insulation 4 has 1.0 mm openings 5 formed at prescribed intervals so that conductors 2 are intermittently exposed. This arrangement constitutes the spacer-separated liquid leakage sensor 1. Conductors 2 may be of other conductive materials than copper and spacers 3 may be plastic or steel and where conductive may act as shielding members.

Since the conductors 2 and spacers 3 are integrally supported by insulation 4 so that the conductors and spacers are on opposite sides of the sensor from each other, a sufficient distance between the conductors 2 and the pipe, for instance, can be maintained by the spacers 3 when the sensor 1 is wrapped around the flange or other areas of a pipe, or other wrapped object, with the spacers located on the inside of the wrapped sensor. Accordingly, contact between the conductors 2 and the metal parts of the pipe can be prevented.

Also, since the conductors 2 are located o the opposite side of the sensor from the spacers 3, the spacing D between the spacers 3 can be made sufficiently small so that the conductors 2 are not pushed against the pipe as a result of the conductors 2 distending inwardly when the sensor 1 is wrapped around the pipe. Accordingly, there is no danger of the conductors 2 breaking through the insulator 4 and protruding from the sensor.

Since the insulation 4 has 1.0 mm openings 5 which are regularly formed so that the conductors 2 are exposed at prescribed intervals along their lengths, any liquid leaking from the welded joints or flanges of the pipe will collect in these openings 5 and short-circuit the conductors 2 so that the liquid leakage is detected by a detector (not shown in the figure) connected to the sensor 1.

The invention thus provides a cable form of sensor which can be conveniently wrapped around pipes and other liquid containing objects in order to detect liquid leakage from the pipes, the sensor being a spacer-equipped liquid leakage sensor which protects the sensor conductors and detects liquid leakage with high reliability even in cases where the sensor is wrapped around a small-diameter part, or where a large force is applied to the sensor. The width of the sensor can thus be decreased as a result of this configuration.

Furthermore, the present invention is not limited to the example of application described above and various modifications and changes will suggest themselves to those skilled in the art. These and other changes will only be limited in scope by the appended claims.

We claim:

1. A liquid leakage sensor comprising:
   (a) a strip of insulative material;
   (b) a spaced apart pair of insulated spacers attached to one side of said strip, (c) a spaced apart pair of insulated conductors attached to the opposite side of said strip, the position of said pair of conductors lying generally between and nearer the center of said strip than said pair of spacers; and (d) a series of regularly spaced apertures through said strip of insulation between each of said conductors and the opposite surface of said strip.

2. A sensor of claim 1 wherein said strip of insulative material and the insulation on said spacers and conductors is porous expanded polytetrafluoroethylene.

3. A sensor of claim 1 wherein said spacers consist essentially of conductive metal.

4. A sensor of claim 1 wherein said spacers consist essentially of non-conductive material.

5. A sensor of claim 4 wherein said non-conductive material is a plastic.

* * * * *